Figure 1:
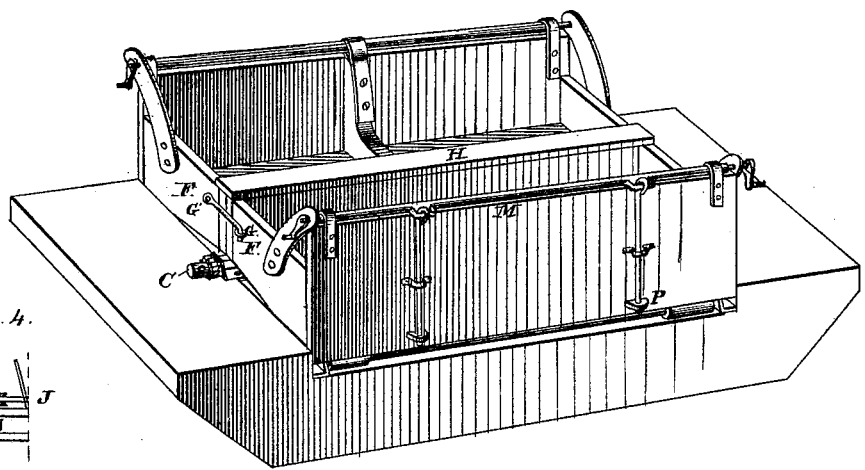
Figure 4:
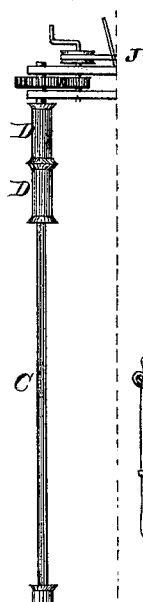

T. T. CHURCH & A. STILLWELL.
Dumping-Scow.

No. 213,387. Patented Mar. 18, 1879.

Attest:
W. E. Bennett
George H. Church

Inventors,
Thos. T. Church
Adrian Stillwell

UNITED STATES PATENT OFFICE.

THOMAS T. CHURCH AND ADRIAN STILLWELL, OF FORT HAMILTON, N. Y.

IMPROVEMENT IN DUMPING-SCOWS.

Specification forming part of Letters Patent No. 213,387, dated March 18, 1879; application filed January 19, 1878.

*To all whom it may concern:*

Be it known that we, THOMAS T. CHURCH and ADRIAN STILLWELL, of Fort Hamilton, in the county of Kings and State of New York, have invented a new and useful Improvement in Dumping-Scows for the transportation of earth, stone, garbage, street-refuse, and like material, of which the following is a specification:

Barges or transports for the removal of garbage and earth have been generally made as flat-boats, either decked over or not, as desired, the cargo being put in the boat or on the deck, and being removed therefrom by hand, causing a great amount of labor and expense, and detaining the boat at the place of discharge, as well as the accompanying tug-boat, and, when the discharge is made at sea or outside of a harbor, resulting in considerable danger from storms and heavy weather.

To avoid these difficulties the bottoms of the barges heretofore used for carrying mud or matter such as is dredged or excavated from slips are made to drop or fold away, and thus drop the contents, the barge being floated by a chamber surrounding the central part where the drop-bottom is.

Boats of this class are unsuitable and cannot be used for the transportation of garbage, vegetable matter, or other substances of light specific gravity, which will not thus discharge through the bottom, in consequence of the resistance and buoyancy of the water. Such boats with traps at the bottom, used for conveying mud, &c., besides being expensive in construction, have but little buoyancy in the water, and are heavier and of much greater draft than ordinary vessels of the same capacity, and when unloading require water deep enough not only to float the vessel and cargo, but an extra depth underneath to allow the traps to swing clear of the ground, and of the matter there deposited. Should they strike bottom while unloading, especially at high water or on a receding tide, they are liable to remain grounded, and thus sustain serious damage or loss. They are also very difficult of towage, in consequence of the obstruction in the water caused by the unevenness of the bottom.

Our invention relates to so constructing transports that the advantages of the self-discharging scow are acquired without its disadvantages; and consists in combining, in a transport, a barge and tanks, or receivers, or cars in such a manner that, when filled with either mud or garbage, they may be unloaded quickly and without handling the cargo, and if loaded with earth, stone, or like material, for the purposes of "filling in," &c., being of light draft and smooth bottom, they may be taken in shoal water, over flats and other low places, and may be run aground at any time of tide desired without fear of injury or detention, for when the cargo is discharged, which requires but a few moments of time, the vessel floats at once, and is taken off without difficulty.

Heretofore such places have been filled in usually by hand, or by means of carts and wagons.

The great reduction of time, labor, and expense effected by the adoption of our improvement constitute an important advantage.

In the case of vessels loaded with garbage or like material, which is intended to be dumped at sea or in the waters outside of a bay or harbor, the ease and rapidity with which the unloading may be effected allow advantage to be taken of the winds and tides, so as to carry the offensive matter to sea. This has not heretofore been accomplished.

The length of time required for unloading, even with the aid of a large number of men, is such that, by reason of a change of tides or winds, or both, a considerable portion of the cargo is cast upon the neighboring shores, to the great disadvantage and annoyance of the inhabitants.

Another advantage consists in the fact that by a rapid and sudden discharge of the garbage in a body much of it is precipitated at once below the surface of the water along with the heavier material with which it is mixed, and, becoming saturated, remains at the bottom instead of drifting upon or near the surface.

Figure 2:
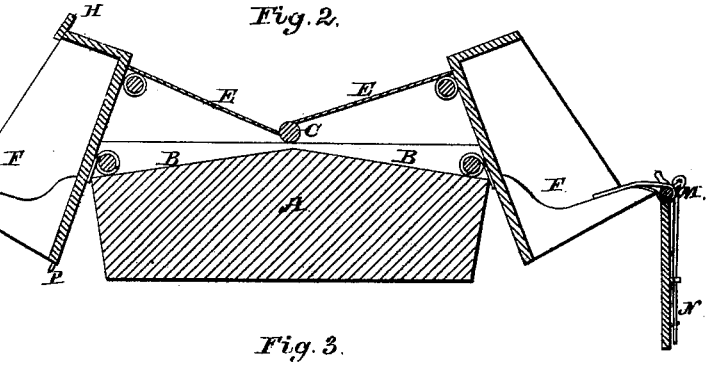
Figure 3:
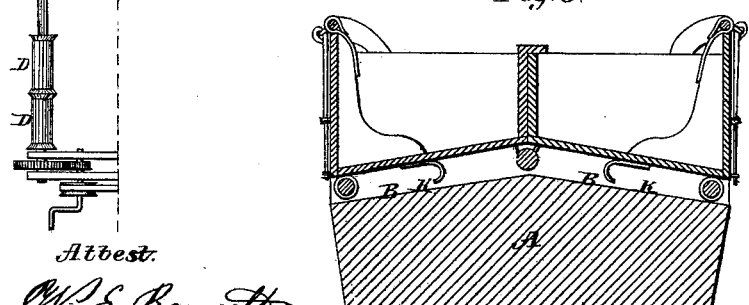

In the accompanying drawings, in which similar letters of reference indicate like parts, Figure 1 is a perspective view of a vessel furnished with our improvement, and Figs. 2 and 3 are longitudinal sections of the same. The remaining figures represent different parts of the improvement and of certain mechanical contrivances connected therewith, as hereinafter specified and described.

The barge A is a flat-boat or scow having a deck, preferably sloping from a central line to the sides, forming the two inclines B B.

At or near the center of the boat, running lengthwise of it, either above or below the deck, is a shaft, C, connected with a suitable windlass, by which it is revolved. This shaft has upon it pulleys or rolls D D D, to which the ropes or cables E E are attached, and about which they are wound by the revolution of the shaft.

Tanks or cars F F are made preferably with sloping bottoms, to correspond with the slope of the deck, upon which they are placed, and on which they move. The sides may be vertical, and the tops of the sides level or horizontal. They are placed, with their backs together, along the center line of the vessel in pairs, one car on each incline, and held in that position by hooks G G, the space between them covered by a strip, H, projecting over from the top of the back of one of the cars, to prevent anything from falling between, and serving as a convenient platform to walk upon. They are connected, by cords, chains, or ropes E, to the drums D D on the shaft C, and, by the winding up and releasing of the cords on the drums, they are made to travel up and down the incline, those on one side moving at the same rate and at the same time as those on the opposite side, thus discharging the cargo without careening the vessel. The gearing of the windlass is provided with a brake or friction band, J, by which the speed of the downward movement is checked and regulated to any speed required.

The cars may move on slides, rails, rolls, rollers, or wheels. We prefer to attach rollers to the bottom of the car, at or near the back, toward the center of the boat, so that they will run on tracks on the deck or incline; also, to attach rollers to the deck or incline, near the side of the boat, so that tracks on the bottom of the car will run on them.

Hooks K K are placed on the lower side of the bottom of the car, preferably a trifle nearer the longitudinal central line of the bottom than the longitudinal line of the center of gravity, which differ on account of the greater depth of the sides of the car at the front—that is, at the lower end of the slope or decline. These hooks, upon the descent of the car, clasp the roller that is attached to the deck near the side of the boat, and thus aid the chains and ropes in securing the car and retaining it in position while dumping. The front or outside of each car—that is, at the edge of the boat—is fastened to the car by the shaft M, from which it is suspended, and on which it turns or swings, or by pins fastening it to suitable arms. The said front side is also fastened at the bottom by bolts N N, passing through eyes P P on the platform of the car, which bolts may be withdrawn from the eyes simultaneously by means of cranks or eccentrics on the shaft M, operated by a windlass, or automatically by the descent of the car. The bolts are spring-catches, so arranged as to catch in the eyes when the front is closed, and when they are withdrawn the front side swings open.

Instead of the sliding or rolling cars we may use cars or receivers consisting of a bottom or flat piece and a side piece at about right angles thereto on the back, (toward the center of the boat,) this receiver being pivoted on the barge at a point about one-third the distance from the center line to the side of the boat. The receivers may be tipped by a screw or other suitable device at or near the center of the boat, raising the sides of the receivers and throwing them toward the side of the boat and discharging the contents.

Instead of the inclined deck and the sloping bottoms to the cars, they, or either of them, may be made horizontal or level, and the cars moved to the sides and dumped by means of suitable mechanism.

The mode of operation is as follows: The cars are drawn to the top of the inclines by the cords attached to and wound round the drums D D on the shaft C, and are hooked together by the hooks G G, the hung and movable sides of the cars (at the edge of the boat) being fastened to the platform of the car by the bolts. The load is now put in the cars and transported to its destination. The shaft C being released, the cars run to the foot of the incline by their own gravity, (regulated in their speed by the brake or friction roller J,) the hooks K K clasp the roller, and the cars then tip up automatically and discharge their contents, the front sides having been released by the withdrawal of the bolts. The cars are now drawn back to their original position, (the bolts catching in the eyes,) and, being fastened together by the hooks as before, are ready for another cargo.

The cars are always discharged two at once—one on each side of the boat—which thus prevents careening. When there are several pairs of cars on one boat they may be discharged one or more pairs at a time or all together, as required.

Having thus described our invention, we claim as new and desire to secure by Letters Patent—

1. Movable dump tanks or cars in pairs supported on the two opposite sides of the deck of a vessel-transport, and arranged to dump their contents outwardly at the sides of the transport.

2. A vessel transport or float provided with a deck or deck-frame sloping downward from the center to the sides, in combination with dumping tanks or receivers, placed one on each side of the transport, and arranged to dump their contents at or over its sides.

3. A vessel transport or float provided with a deck or deck-frame sloping downward from the center to the sides, in combination with movable dump-tanks arranged to balance each other on the two inclines and to slide down automatically and dump their contents at the sides of the transport when released for that purpose.

4. The combination, upon a scow or other vessel, of planes sloping from the center downward to each side with a shaft or drum placed along the center, and receivers or cars so arranged that when the shaft is released or rotated the cars run down to each side of the vessel and dump their contents, substantially in the manner described.

5. The barge A, provided with a deck having the inclines B B, in combination with the tanks or cars F F, having their bottoms inclined to correspond with the inclines B B, as shown and described.

6. The float A, inclines B B, cars F F, shaft C, and ropes or cables E E, all in combination, as shown and described.

7. The inclines B B on a barge, A, and the cars F F, provided with the hooks K K, or their equivalent, in combination, for the purposes set forth.

8. The car F, provided with a dumping-gate, a hook or stop, K, and a rope or chain, E, in combination with the inclined deck B of a barge, A, and a shaft, C, as and for the purpose described.

9. The cars F F, provided with the hooks or stops K K and chains or ropes E E, in combination with the inclined decks B B of a barge, A, and a shaft, C, as and for the purposes set forth.

10. The cars F F, placed on each side of the deck of a barge, A, one of which is provided with a central platform, H, and in combination therewith.

THOS. T. CHURCH.
ADRIAN STILLWELL.

Witnesses:
W. E. BENNETT,
GEORGE H. CHURCH.